Dec. 29, 1925.  B. W. KING  1,567,603
CONTROL AND STEERING MECHANISM FOR AUTOMOBILES
Filed August 6, 1920  2 Sheets-Sheet 1

Inventor
Bertell W. King
By his Attorney
Samuel E. Darby

Dec. 29, 1925.  1,567,603
B. W. KING
CONTROL AND STEERING MECHANISM FOR AUTOMOBILES
Filed August 6, 1920     2 Sheets-Sheet 2
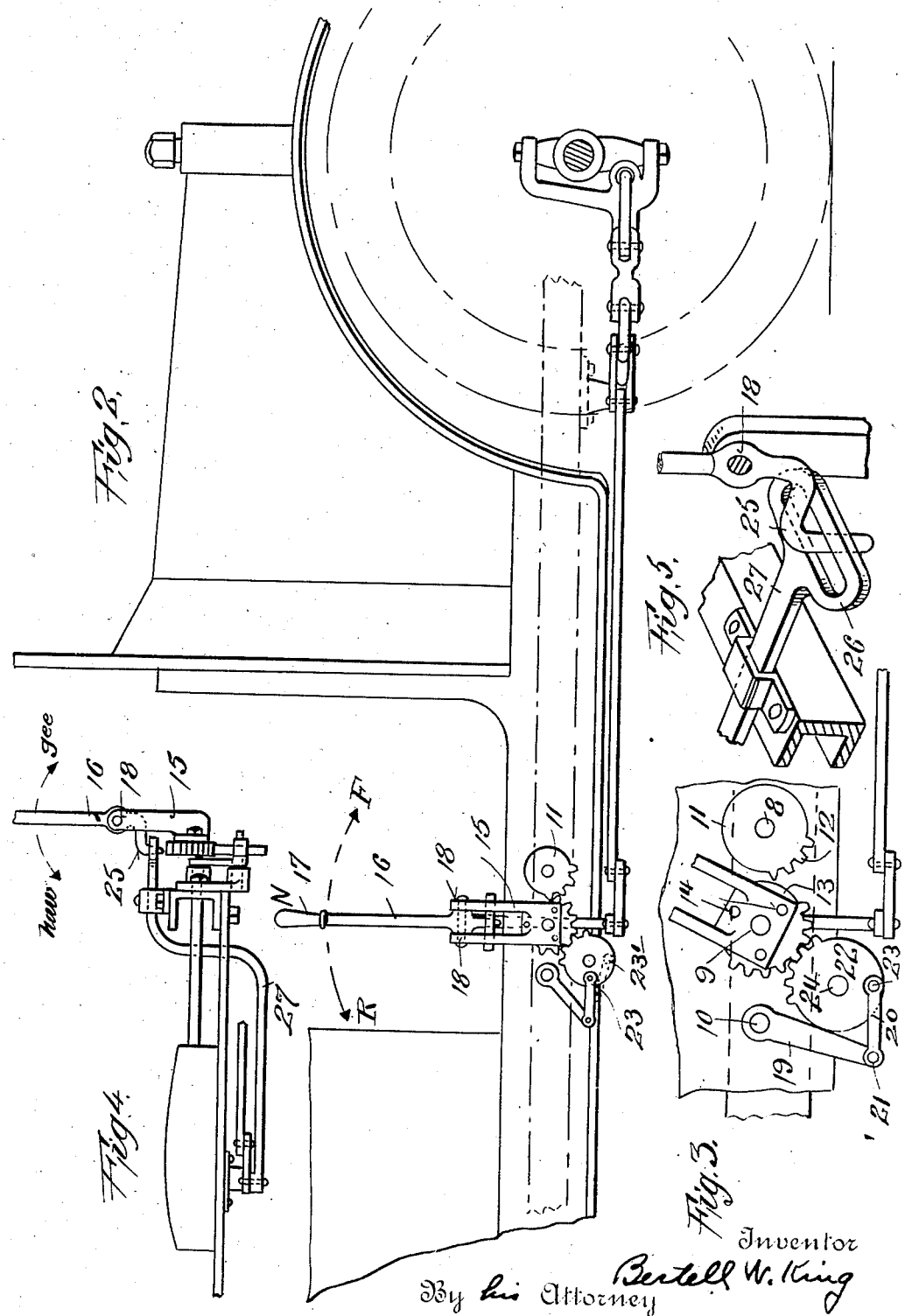
Inventor
Bertell W. King
By his Attorney
Samuel E. Darby Patented Dec. 29, 1925.

1,567,603

UNITED STATES PATENT OFFICE.

BERTELL W. KING, OF NEW YORK, N. Y.

CONTROL AND STEERING MECHANISM FOR AUTOMOBILES.

Application filed August 6, 1920. Serial No. 401,807.

*To all whom it may concern:*

Be it known that I, BERTELL W. KING, a citizen of the United States, residing at New York, county of Kings, State of New York, have made a certain new and useful Invention in Control and Steering Mechanism for Automobiles, of which the following is a specification.

The use of automobiles, or auto trucks, for distributing or collecting articles from house to house, as, for example, in the delivery of goods, groceries, etc., from stores, or by milkmen, bakers, laundrymen and others, or for collection of ashes, etc., has been greatly handicapped by the time required by the driver, who usually acts also as the collector or deliveryman, to get into and out of his machine for operating it while collecting or delivering his goods.

I propose to overcome this disadvantage by providing a new and novel control and steering mechanism which may be operated from the running board of the automobile, or truck, whereby the machine can be quickly and conveniently operated to start, guide and stop the same, without the necessity of taking the time required to get into the driver's seat in the car. The control mechanism which I provide is in the nature of an auxiliary device by which the car is operated through the usual operating mechanism, and which permits its normal operation by said usual mechanism when it is desired to use the same instead of using the auxiliary device. I attach this device to the side of the chassis of the automobile, or truck, and usually, though not necessarily, on the right hand side, so that the same may be operated by standing on the running board, or by walking alongside of the machine. As will be seen from the description and drawings, the device is quite simple, easily applied and readily operated, and offers the advantage of operating the car or truck readily so as to adapt the same for the purposes above stated. Obviously, an auxiliary extension seat could also be provided, if desired.

These and other objects which will become apparent hereinafter by the description and claims, I attain by the mechanism illustrated in the accompanying drawings, of which—

Fig. 2 represents a side elevation of a similar machine, showing more particularly the steering attachment, likewise, in side elevation.

Fig. 3 represents an enlarged side view of a portion of the control mechanism.

Fig. 4 represents a view on lines 4—4 of Fig. 1.

Fig. 5 represents a detailed view of the connecting link of the steering device and the control or guide handle.

Similar numerals refer to similar parts throughout the several views.

Figure 1:
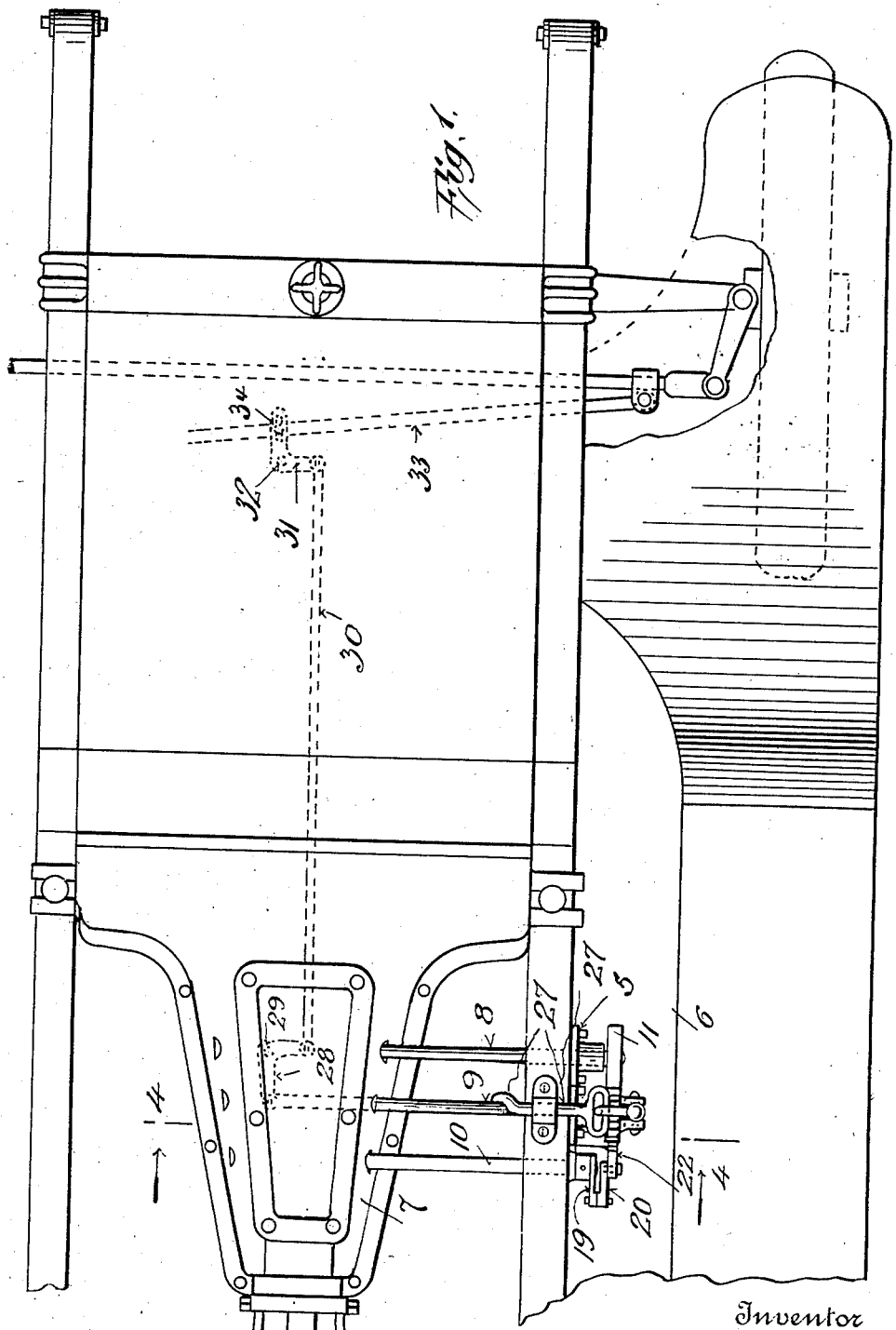
Fig. 1 represents a plan view of the front part of an automobile which is equipped with my auxiliary control and steering mechanism.

Referring now to the drawings, Fig. 1 represents the front portion of an automobile, or truck, of any type. This representation has been selected for the purpose of illustration merely, and to show a practical application of my invention. In this view the steering mechanism is shown in part in dotted lines, and my auxiliary control device is shown as being mounted on the outside of the chassis at 5, and in such a position as to be operated from the running board 6, or while walking at the side of the machine. Suitable means for operatively uniting my auxiliary control mechanism to the control mechanism that is on the car to which my control is to be applied, may be used. Illustrative of such application, however, I have elected to employ shafts 8, 9, and 10 which may be taken as the reverse, the clutch and the brake shafts respectively, and which are in engagement with corresponding elements within a housing 7, or other equivalent structure. To the reversing shaft 8 is securely fastened a driving wheel 11 partially toothed as at 12. A similar wheel 13, but having a greater number of teeth, is fastened to the clutch shaft 9, which for convenience may be designated the clutch control wheel. To this control wheel there is fastened, by rivets 14, a rocking yoke 15, for the control lever 16, which has a handle 17. The control lever 16 is pivotally mounted at 18 for the purpose stated below.

On the brake shaft 10 there is fastened a crank arm 19, carrying a link 20, pivotally connected at one end 21, to the crank arm, and at the other to a brake transmission wheel 22, by a pivot 23. This transmission wheel is mounted to move freely on a bearing 24.

The mechanism thus far described may for convenience be called the auxiliary control mechanism, which operates as follows:—

With the control lever is a vertical or neutral position, as at N (Fig. 2), it is evident that the brake is applied the same as if the foot lever were depressed. At the same time the clutch is in released position. It will be noted that the reverse driving wheel 11 is in the last toothed or disengaging position, while the brake transmission wheel is fully engaged with the teeth of the clutch wheel. In this position the engine may be permitted to run, or it may be stopped, as desired. Ordinarily, if only short stops are made, the engine is permitted to idle quietly. Obviously a gas control device could also be extended and connected to the control mechanism, if desired, but for simplicity, I have not shown such extension.

If it is now desired to move the car forward, it will only be necessary to push the control lever in the forward direction to the position F, or to any point between N and F, as may be desired. This movement gradually releases the brake and permits the clutch to engage the drive shaft to thereby put the machine in motion. The relation of my auxiliary control mechanism when the control lever is in the forward position F, is illustrated by Fig. 3. It will be noted that in this position the brake transmission wheel has been moved to position 23′, which is represented in dotted lines in Fig. 2. If it is desired to stop the car, the control lever is brought back to the neutral position.

Should it be desired to back the car, it will only be necessary to bring the lever to the point R, when the brake will again be released, the clutch permitted to operate, and the reverse gear brought into operation by means of the gear teeth 12 engaging with the teeth on the control wheel 13. This operation is similar to the action when the reversing mechanism or lever is operated. By bringing the control lever back to N, obviously the car will be stopped. By this simple movement it is possible to quickly move the car backward or forward, and this operation is very desirable if the car is to be moved for short distances.

To steer the car by my improved auxiliary attachment, I have provided a simple and effective steering mechanism herein illustrated by the figures. It will be observed from Figs. 2, 4 and 5 in particular, that the control lever is pivotally mounted at 18 in the rocker yoke 15, and may be rocked laterally to the right or left indicated in Fig. 4 by gee and haw. An extension finger 25, on the end of the control lever, fits loosely into an eye 26, at the end of a sliding guide lever 27. This lever engages a bell crank 28 pivoted at 29. To 29 there is attached a link 30, which in turn engages a bell crank 31. Bell crank 31 is pivotally mounted at 32 and engages a guide rod 33 and 34. The guide rod 33 is pivotally connected to the steering knuckle in the usual way.

It is apparent that by the mechanism above described, the car may be guided by the control lever which, for a straight forward direction, is kept in alignment with the rocker yoke. If it is desired to steer the car either to the right or to the left, the control lever is rocked to either of the directions indicated in Fig. 4 by gee and haw, respectively.

It is apparent from the disclosure herein given that I have provided a simple and efficient attachment for application to automobiles or auto-vehicles of the standard type. If my invention is applied to a Ford car, for example, the present construction is operative when the emergency lever is in neutral. In all cases, however, is the invention to be used only with low speeds and not with high speeds as it would be exceedingly dangerous to operate a machine from the running board at high speeds. It is also evident to those skilled in the art that while I have described a specific embodiment of my invention as applied to a specific construction, the same is not to be limited thereby.

Having now set forth the objects and nature of my invention, and a construction embodying the principles thereof, what I claim as new and useful and of my own invention, and desire to secure by Letters Patent is:

1. In an auto-vehicle, the combination of an auxiliary control and steering mechanism comprising side extension devices and means attached to said devices, said means comprising brake-links, steering links and rocker wheels, a rocker yoke mounted on one of said wheels and an operating lever mounted pivotally on said yoke to rock at right angles to the movement of the yoke for controlling and for guiding the vehicle.

2. In an auto-vehicle, the combination of an auxiliary control and steering mechanism comprising side extension devices and means attached to said devices, said means comprising brake links, steering links and rocker wheels, a rocker yoke mounted on one of said wheels and an operating lever pivotally mounted on said yoke to rock at right angles to the movements of the yoke, and an extension finger on said lever whereby the vehicle is guided.

3. The combination in a main operating mechanism and an auxiliary operating mechanism for auto-vehicles, of extension members from said main mechanism extending beyond the frame of said vehicle, of rocker wheels and operating links mounted on said extension members, a rocker yoke fastened to one of said wheels, and a pivoted link fastened to another of said wheels, a crank arm pivotally attached to said link at one end and rigidly fastened to a brake controlling device at the other, a control lever pivotally mounted on said rocker yoke to rock at right angles to the movements of the yoke for simultaneously controlling and steering said vehicle.

4. In an auxiliary control and guide mechanism for auto-vehicles, a plurality of control pinions mounted laterally of the vehicle frame, said pinions being provided with intermeshing teeth and tooth-less areas, a pivot stud on one of said pinions in the region of the tooth-less area, a brake link connected to said stud, a U-shaped rocker arm connected to one of said other pinions and an operating lever suspended between said U-space for causing the tooth-areas to intermesh, connections extending from said rocker arm and said pinions whereby the vehicle may be controlled and guided by rocking of the lever as a whole and in part at right angles to the movements, of the lever in its entirety.

In testimony whereof I have hereunto set my hand on this 4th day of August, A. D. 1920.

BERTELL W. KING.